(12) United States Patent
Nguyen et al.

(10) Patent No.: US 12,399,469 B2
(45) Date of Patent: Aug. 26, 2025

(54) REGRESSION-OPTIMIZATION CONTROL OF PRODUCTION PROCESS WITH DYNAMIC INPUTS

(71) Applicant: INTERNATIONAL BUSINESS MACHINES CORPORATION, Armonk, NY (US)

(72) Inventors: Lam Minh Nguyen, Ossining, NY (US); Pavankumar Murali, Ardsley, NY (US); Nianjun Zhou, Chappaqua, NY (US); Binny Winston Samuel, Troy, MI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 375 days.

(21) Appl. No.: 18/315,621

(22) Filed: May 11, 2023

(65) Prior Publication Data
US 2024/0377810 A1    Nov. 14, 2024

(51) Int. Cl.
*G05B 13/04* (2006.01)
*G05B 19/418* (2006.01)

(52) U.S. Cl.
CPC ..... *G05B 13/042* (2013.01); *G05B 19/41885* (2013.01)

(58) Field of Classification Search
None
See application file for complete search history.

(56) References Cited

U.S. PATENT DOCUMENTS

| 8,285,777 | B2 | 10/2012 | Giles et al. |
| 11,099,529 | B2 | 8/2021 | Phan et al. |
| 2003/0046130 | A1 | 3/2003 | Golightly et al. |

(Continued)

FOREIGN PATENT DOCUMENTS

| CN | 105825288 B | 8/2016 |
| CN | 115409272 A | 11/2022 |

OTHER PUBLICATIONS

Liu et al., "Optimal Antibody Purification Strategies Using Data-Driven Models", Engineering, vol. 5, Oct. 18, 2019, pp. 1077-1092 (Year: 2019).

*Primary Examiner* — Ryan A Jarrett
(74) *Attorney, Agent, or Firm* — Michael A. Petrocelli, Esq.; Kevin P. Radigan, Esq.; Heslin Rothenberg Farley & Mesiti P.C.

(57) ABSTRACT

Dynamic control of a production process of a manufacturing system is facilitated, where the control process includes receiving runtime input data for multiple input variables of the production process. The production process is represented, at least in part, by a physics-based expression, with at least one term of the physics-based expression being a function of two or more input variables of the production process. The control process includes determining coefficient and bias terms for a dynamic linear model connecting the multiple input variables and an output of the production process, where the terms are based, at least in part, on the input variables. The dynamic linear model and determined coefficient and bias terms are provided in an optimization model to generate a regression-optimization model which determines an optimized value of a control variable for the production process, which is used in facilitating control of the production process.

20 Claims, 12 Drawing Sheets

(56) References Cited

U.S. PATENT DOCUMENTS

2003/0065410 A1* 4/2003 Martin ................... G05B 17/02
                                                    700/39
2020/0167678 A1* 5/2020 Masin .................... G06F 17/11
2020/0387818 A1   12/2020 Chan et al.
2023/0259830 A1*  8/2023 Subramanian ....... G06N 3/0499
                                                    706/12

* cited by examiner

EXAMPLE 1: 700

$$\frac{\frac{a}{b}-1}{a+\frac{1}{c}} + \frac{5a+b}{a+\frac{1}{b}} = \frac{\frac{a-b}{b}}{\frac{ac+1}{c}} + \frac{5a+b}{\frac{ab+1}{b}} = \frac{(a-b)c}{b(ac+1)} + \frac{(5a+b)b}{ab+1} =$$

$$= \frac{(a-b)c}{b(ac+1)} + \frac{(5a+b)b}{ab+1} = \frac{ac-bc}{abc+b} + \frac{5ab+bb}{ab+1} =$$

$$= \frac{(ac-bc)(ab+1) + (5ab+bb)(abc+b)}{(abc+b)(ab+1)} =$$

$$= \boxed{\frac{aabc + ac - abbc - bc + 5aabbc + 5abb + abbbc + bbb}{aabbc + abc + abb + b}} \quad 701$$

FIG. 7A

EXAMPLE 2:

$$\cfrac{a+b}{a+\cfrac{1}{b+\cfrac{1}{c+\cfrac{1}{d}}}} = \cfrac{a+b}{a+\cfrac{1}{b+\cfrac{1}{\frac{cd+1}{d}}}} = \cfrac{a+b}{a+\cfrac{1}{b+\cfrac{d}{cd+1}}} = \cfrac{a+b}{a+\cfrac{1}{\frac{bcd+b+d}{cd+1}}} =$$

$$= \cfrac{a+b}{a+\cfrac{cd+1}{bcd+b+d}} = \cfrac{a+b}{\cfrac{abcd+ab+ad+cd+1}{bcd+b+d}} =$$

$$= \cfrac{abcd+ab+ad+bbcd+bb+bd}{abcd+ab+ad+cd+1}$$

FIG. 7B

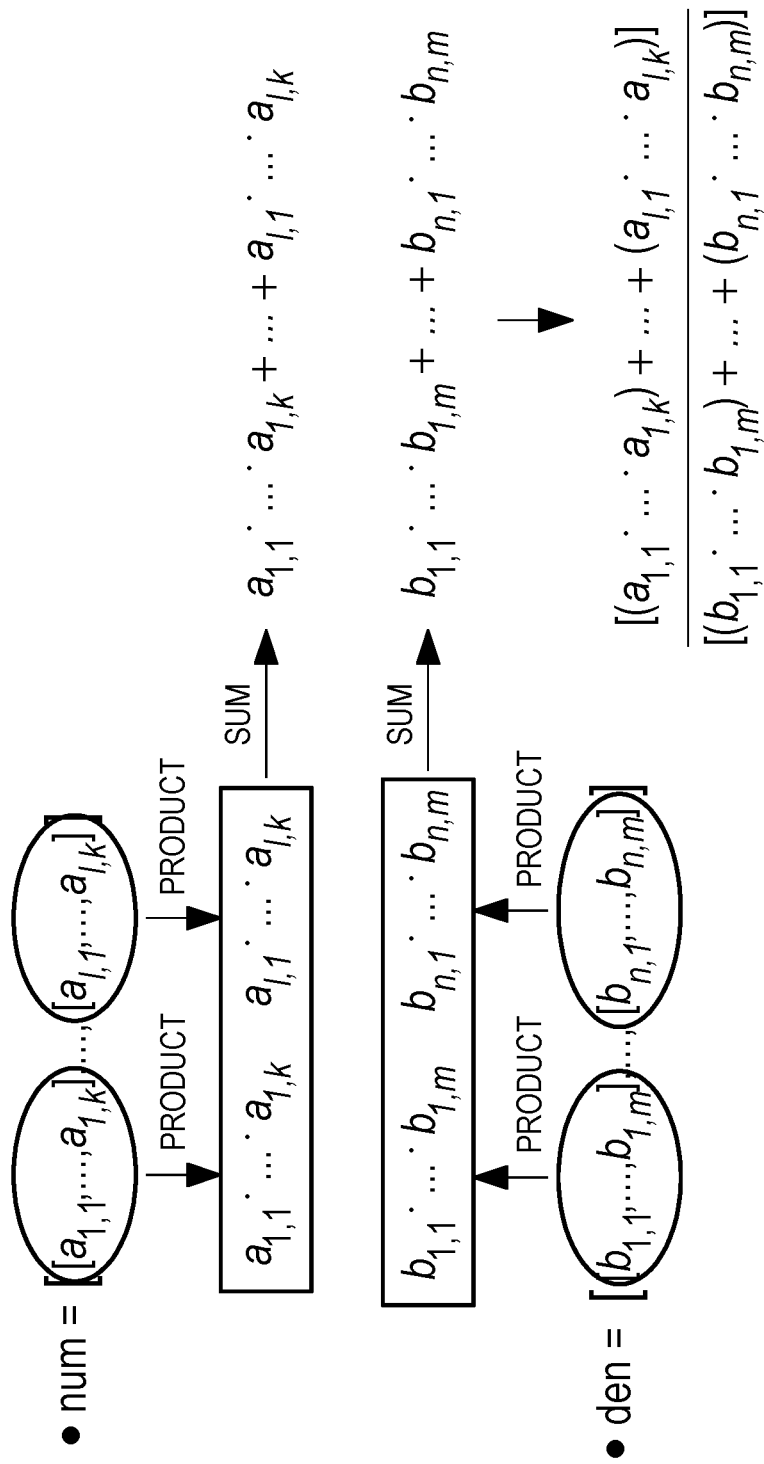

EXPRESSION

Example input with 5 dimensions $x = [x[1], x[2], x[3], x[4], x[5]]$

The example has the following coefficients:

$w_1 = 2 \cdot x[4] + x[4] \cdot x[4] - 1 - x[5] \cdot x[4]$ $w_2 = \dfrac{1}{2 - 2 \cdot x[4] \cdot x[5] + 2 \cdot x[4] \cdot x[4]}$ $w_3 = x[4]$ $w_4 = 0$ $w_5 = 0$ and $b = \dfrac{x[4] + 2 \cdot x[5]}{x[4] \cdot x[5]}$ The output $y = w_1 \cdot x[1] + w_2 \cdot x[2] + w_3 \cdot x[3] + w_4 \cdot x[4] + w_5 \cdot x[5] + b$

FIG. 9A

CODE

```
# Define coefficients and bias by format
coefficient_notation_dict = {
  1: {'numerator': [[2,[4]],[[4],[4]],-1,[[5],[4],-1]],
      'denominator': 1},
  2: {'numerator': 1,
      'denominator': [2,[[4],-2,[5]],[[4],[4],2]]},
  3: [4],
  4: 0,
  5: 0,
} bias_notation_dict = {
  1: {'numerator': [[[4]], [2, [5]]],
      'denominator': [[[4], [5]]]}
}

# Train new model
model_DLM = DynamicLinearModel(coefficient_notation_dict,
bias_notation_dict)
```

FIG. 9B

DYNAMIC OBSERVED VARIABLES AT A PRODUCTION PROCESS NODE $$y = \underbrace{w_1^z z_1} + \ldots + \underbrace{w_{m_z}^z z_{m_z}} + \underbrace{w_1^x x_1} + \ldots + \underbrace{w_{m_x}^x z_{m_x}} + b + \underbrace{w_1^o o_1} + \ldots + \underbrace{w_{m_o}^o o_{m_o}}$$

$$\underbrace{w_1^o o_1 + \ldots + w_{m_o}^o o_{m_o}} \rightarrow \text{ZERO } (=0)$$

CAN BE DEPENDENT ON OBSERVED DYNAMIC VARIABLES $$\frac{[(a_{1,1} \cdot \ldots \cdot a_{1,k}) + \ldots + (a_{l,1} \cdot \ldots \cdot a_{l,k})]}{[(b_{1,1} \cdot \ldots \cdot b_{1,m}) + \ldots + (b_{n,1} \cdot \ldots \cdot b_{n,m})]}$$

IF THE OBSERVED VALUES CHANGES, THEN THE COEFFICIENTS AND BIAS OF THE DYNAMIC LINEAR REGRESSION MODEL ADAPTIVELY CHANGE

FIG. 10B

REGRESSION-OPTIMIZATION CONTROL OF PRODUCTION PROCESS WITH DYNAMIC INPUTS

BACKGROUND

One or more aspects relate, in general to enhancing processing within a computing environment, and in particular, to enhancing regression-optimization control of a production process of a manufacturing system with dynamic inputs.

Manufacturing industries, including industrial manufacturing industries, continue to transform to a digital semantic representation and control of the manufacturing system, including manufacturing systems having multiple production processes, nodes, plants, etc. This representation can, for instance, be continuously replenished with real-time measurements from sensor networks using high-bandwidth, low-cost networks (i.e., publicly available networks) to provide up-to-date situational awareness of the operational efficiency and yield of each production process of the manufacturing system, and its effect on the demand/supply dynamics of the manufacturing ecosystem. This data-enriched representation, coupled with context-specific predictive analytics, enable enterprises to, for instance, anticipate the need for control point changes and their impact on productivity and yield.

SUMMARY

Certain shortcomings of the prior art are overcome, and additional advantages are provided herein through the provision of a computer-implemented method of facilitating control of a production process of a manufacturing system. The computer-implemented method includes receiving, by at least one processor, runtime input data for multiple input variables of the production process. The production process is represented, at least in part, by a physics-based expression, with at least one term of the physics-based expression being a function of two or more input variables of the multiple input variables of the production process. Further, the computer-implemented method includes determining, by the at least one processor based on the physics-based expression, coefficient, and bias terms for a dynamic linear model connecting the multiple input variables of the production process to an output of the production process. The coefficient and bias terms of the dynamic linear model are based, at least in part, on input variables of the multiple input variables. Further, the computer-implemented method includes providing the dynamic linear model with the determined coefficient and bias terms in an optimization model to generate a regression-optimization model which determines an optimized value of a control variable for the production process, and facilitating control, at least in part, of the production process using the determined optimized value of the control variable.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 7A & 7B are different examples of transforming a complex representation of a term of a physics-based expression into a regular expression (or specified expression) of a coefficient or bias term of a dynamic linear model, in accordance with one or more aspects of the present invention;

FIG. 8 depicts an example process of converting a dictionary of a fraction term to a number for use in a dynamic linear model for control of a production process, in accordance with one or more aspects of the present invention;

FIGS. 9A & 9B depict an example of an expression of coefficient and bias terms of a dynamic linear model converted to program code for use in training a model for computer-implemented control of a production process of a manufacturing system, in accordance with one or more aspects of the present invention; and FIGS. 10A & 10B depict an example of a dynamic linear model with coefficient and bias terms which can be dependent on multiple observed dynamic variables, in accordance with one or more aspects of the present invention.

DETAILED DESCRIPTION

The accompanying figures, which are incorporated in and form a part of this specification, further illustrate the present invention and, together with this detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, or tools only as examples, and not by way of limitation. Furthermore, the illustrative embodiments are described in certain instances using particular software, hardware, tools, or data processing environments only as example for clarity of description. The illustrative embodiments can be used in conjunction with other comparable or similarly purposed structures, systems, applications, or architectures. One or more aspects of an illustrative embodiment can be implemented in software, hardware, or a combination thereof.

Figure 1:
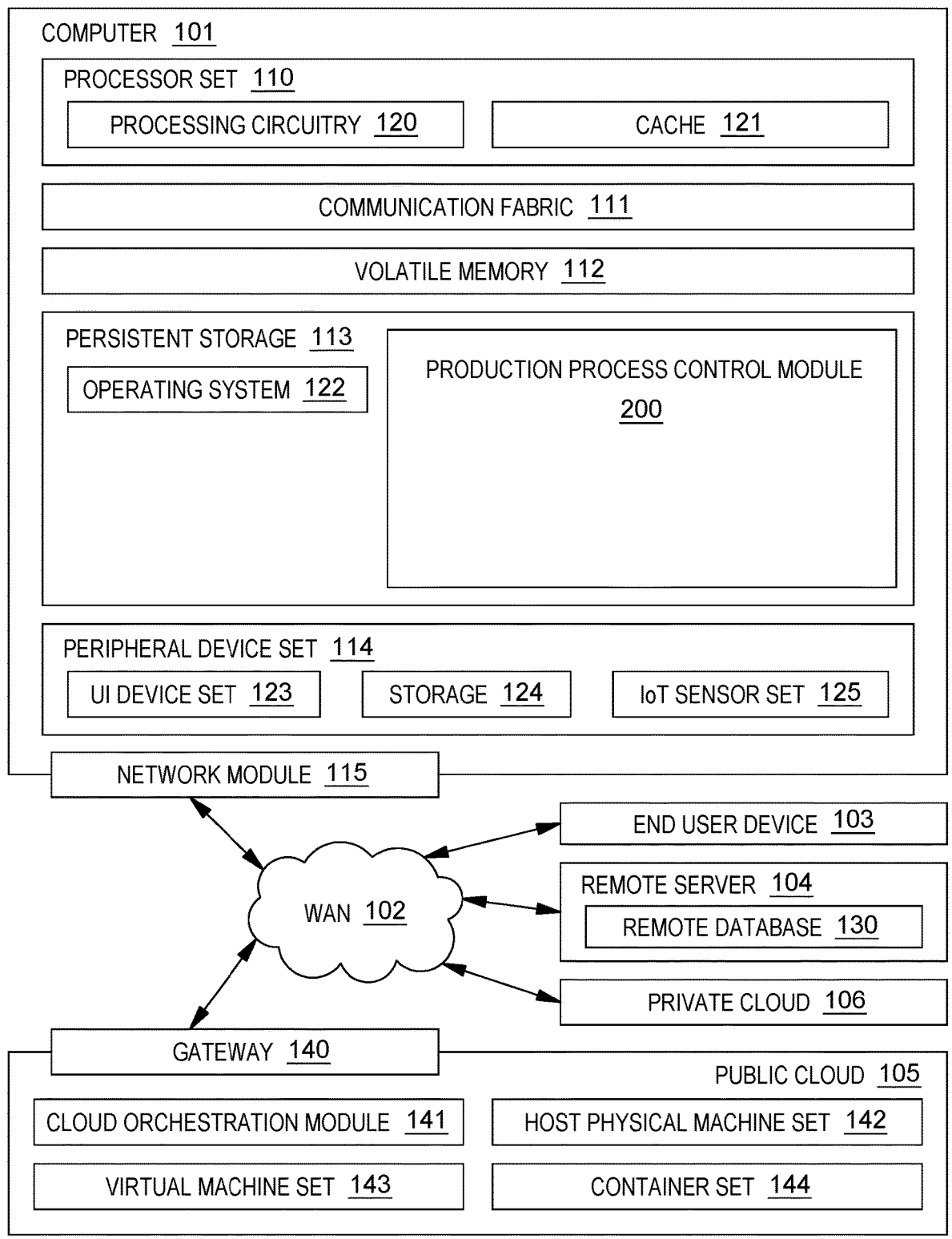
FIG. 1 depicts one example of a computing environment to include and/or use one or more aspects of the present invention.

As understood by one skilled in the art, program code, as referred to in this application, can include software and/or hardware. For example, program code in certain embodiments of the present invention can utilize a software-based implementation of the functions described, while other embodiments can include fixed function hardware. Certain embodiments combine both types of program code. Examples of program code, also referred to as one or more programs, are depicted in FIG. 1, including operating system 122 and production process control module 200, which are stored in persistent storage 113.

One or more aspects of the present invention are incorporated in, performed and/or used by a computing environment. As examples, the computing environment can be of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one processor or multiple processors, and/or any other type of environment and/or configuration, etc., that is capable of executing a process (or multiple processes) that, e.g., perform production process control processing, such as disclosed herein. Aspects of the present invention are not limited to a particular architecture or environment.

Prior to further describing detailed embodiments of the present invention, an example of a computing environment to include and/or use one or more aspects of the present invention is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as production process control module block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 126 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. Further, in one or more embodiments, one or more of the components/modules of FIG. 1 need not be included in the computing environment and/or are not used for one or more aspects of the present invention. Further, in one or more embodiments, additional and/or other components/modules can be used. Other variations are possible.

Figure 2:
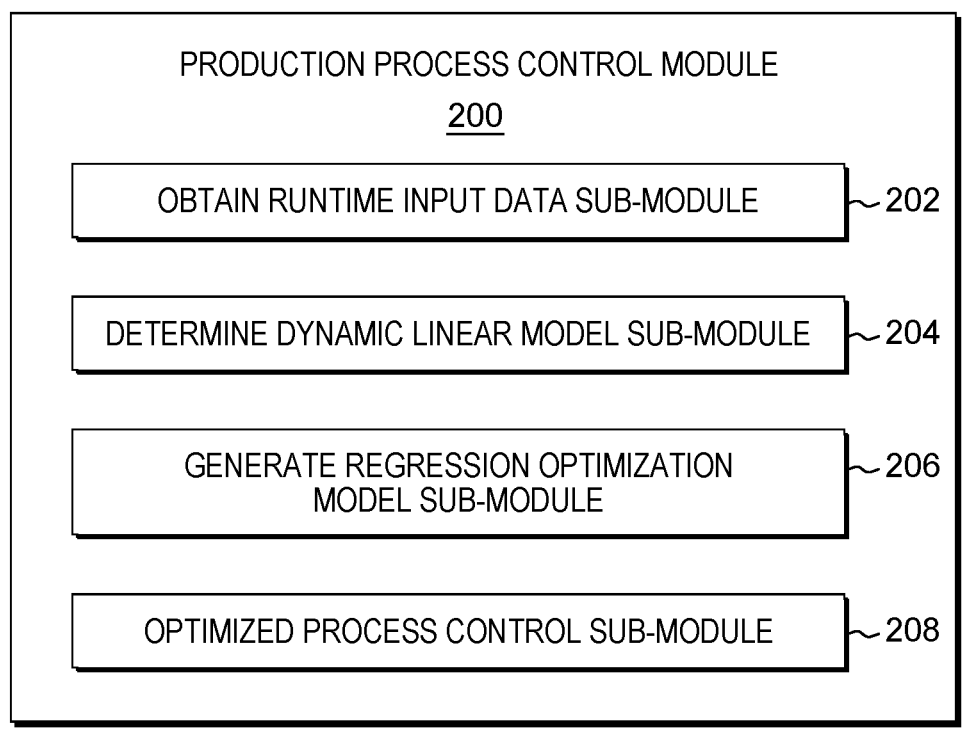
FIG. 2 depicts one embodiment of a computer program product with a production process control module, in accordance with one or more aspects of the present invention.
Figure 3:
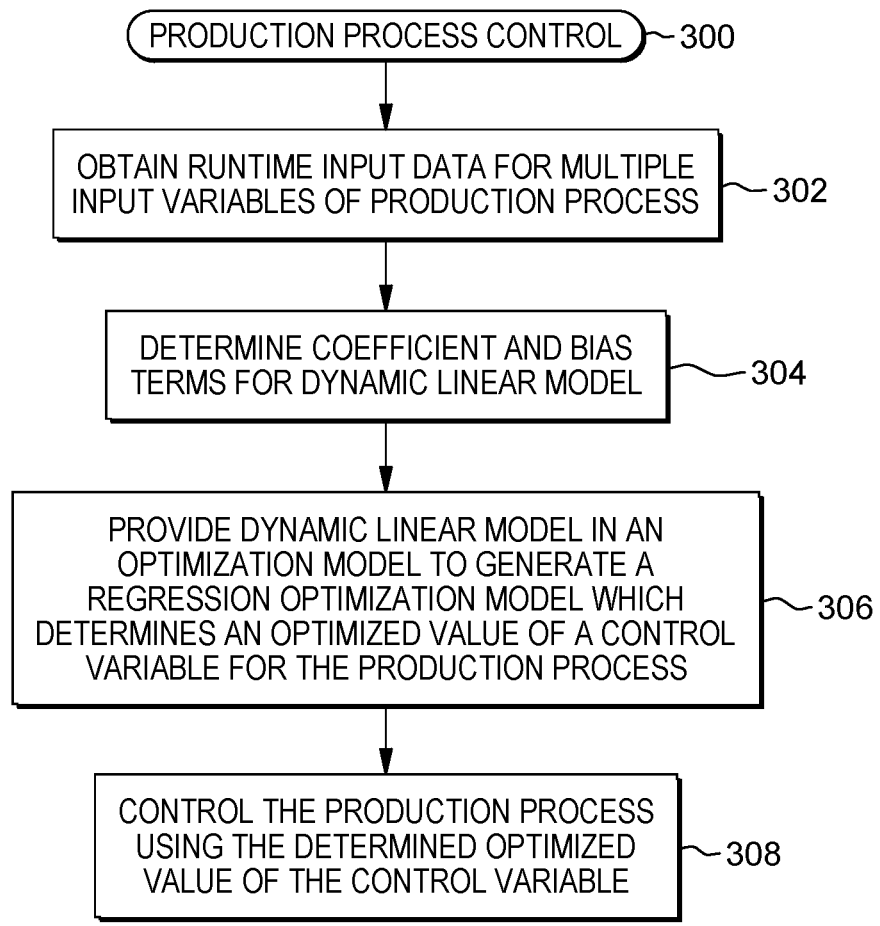
FIG. 3 depicts one embodiment of a production process control workflow, in accordance with one or more aspects of the present invention.

By way of example, one or more embodiments of a production process control module and workflow are described initially with reference to FIGS. 2-3. FIG. 2 depicts one embodiment of production process control module 200 that includes code or instructions to a perform production process control workflow, in accordance with one or more aspects of the present invention, and FIG. 3 depicts one embodiment of a production process control workflow, in accordance with one or more aspects of the present invention.

Referring to FIGS. 1 & 2, production process control module 200 includes, in one example, various sub-modules used to perform processing, in accordance with one or more aspects of the present invention. The sub-modules are, e.g., computer-readable program code (e.g., instructions) and computer-readable media (e.g., persistent storage (e.g., persistent storage 113, such as a disk) and/or a cache (e.g., cache 121), as examples). The computer-readable media can be part of a computer program product and can be executed by and/or using one or more computers, such as computer(s) 101; processors, such as a processor of processor set 110; and/or processing circuitry, such as processing circuitry of processor set 110, etc.

In the FIG. 2 embodiment, example sub-modules of production process control module 200 include, for instance, an obtain runtime input data sub-module 202 to obtain runtime input data from multiple input variables of a production process, where the production process is represented, at least in part, by a physics-based expression, with at least one term of the physics-based expression being a function of two or more input variables of the multiple input variables of the production process; a determine dynamic linear model sub-module 204 to determine, based on the physics-based expression, coefficient and bias terms for a dynamic linear model connecting the multiple input variables of the production process to at least one output of the production process, where the coefficient and bias terms of the dynamic linear model are based, at least in part, on the input variables of multiple input variables. In one or more embodiments, at least one input variable of the multiple input variables is a dynamic input variable. In addition, the production process control module 200 includes a generate regression-optimization model sub-module 206 to provide the dynamic linear model with the determined coefficient and bias terms in an optimization model to generate the regression-optimization model, where the regression-optimization model determines an optimized value of a control variable for the production process; and an optimized process control sub-module 208 to facilitate control, at least in part, of the production process using the determined optimized value of the control variable.

Advantageously, using production process control such as disclosed herein accommodates changes in observed input values, with the coefficient and bias terms of the dynamic linear regression model inherently adaptively changing with changes in observed input values. In this manner, the regression function at the production process or node of a manufacturing system is a dynamic linear model or expression based on dynamic behavior of the observed input values. Further, the dynamic linear model is a regression function which handles the case where one or more coefficients and/or bias terms can be dependent on other input variables. The new regression function is read into or embedded in the optimization model to generate the regression-optimization model, which then determines an optimized value of a control variable for the production process. The production process control can be generalized for manufacturing system-wide process control, and the optimization model can be solved by using mixed integer linear programming-based (MILP) methods, gradient-based non-linear optimization (NLOpt) methods, or derivative-free optimization (DFO) methods. Note that although various sub-modules are described, production process control module processing such as disclosed herein can use, or include, additional, fewer, and/or different sub-modules. A particular sub-module can include additional code, including code of other sub-modules, or less code. Further, additional and/or other modules can be used. Many variations are possible.

In one or more embodiments, the sub-modules are used, in accordance with one or more aspects of the present invention, to perform production process control processing. FIG. 3 depicts one example of a production process control workflow, such as disclosed herein. The method is executed, in one or more examples, by a computer (e.g., computer 101 (FIG. 1)), and/or a processor or processing circuitry (e.g., of processor set 110 of FIG. 1). In one example, code or instructions implementing the method, are part of a module, such as production process control module 200. In other examples, the code can be included in one or more other modules and/or in one or more sub-modules of the one or more other modules. Various options are available.

As one example, production process control 300 executing on a computer (e.g., computer 101 of FIG. 1), a processor (e.g., a processor of processor set 110 of FIG. 1), and/or processing circuitry (e.g., processing circuitry of processor set 110), obtains runtime input data for multiple input variables of the production process 302. The production process is represented, at least in part, by a physics-based expression, with at least one term of the physics-based expression being a function of two or more input variables of the multiple input variables of the production process. In one or more embodiments, at least one input variable of the multiple input variables is a dynamic input variable. Further, the control process determines based on the physics-based expression, coefficient and bias terms for a dynamic linear model connecting the multiple input variables of the production process to at least one output of the production process, where the coefficient and bias terms of the dynamic linear model are based, at least in part, on input variables of the multiple input variables 304. In addition, the control process provides the dynamic linear model with the determined coefficient and bias terms in an optimization model to generate a regression-optimization model which determines an optimized value of a control variable for the production process 306. Further, the control process facilitates control, at least in part, of the production process using the determined optimized value of the control variable 308.

The emergence of artificial intelligence (AI)-based cognitive systems has led to development of cognitive control/advisory systems that can be built for a variety of enterprise functions or processes. For example, a cognitive process advisor can be designed to consume data, such as real-time input data (and/or historical data), to predict production process performance, and to support a controller or control system controlling the production process. The cognitive process advisor can (i) manage setpoints for control of the production process over time horizons of days, weeks, etc., and (ii) provide a health score for the process/asset, as well as provide a rank ordering of importance of issues for mitigation.

In certain solutions, this can entail developing a machine learning model for each process in the manufacturing system that is to be controlled or managed by the cognitive control/advisory system. The generated model has to accurately capture the underlying physical relationships. Conventionally, for certain scenarios, a machine learning model is built using historical data that simulates real-time measurements and hence provides high local temporal fidelity and tracks any non-stationarity in the production process. Using the cognitive control/advisor system also requires selecting and/or developing a setpoint optimization model that, in part, offers the flexibility of dynamically introducing operational restrictions when they arise. The optimization model has to be lightweight yet scalable to provide setpoint recommendations in real-time, or near-real-time. Because the optimization uses a data-driven regression model as a representation of each production process, its runtime complexity, scalability and solution quality guarantees depend on the nature of the model, for instance, whether a piece-wise linear model is used, a non-linear and non-convex deep neural network is used, or a non-continuous ensemble model is used, etc.

With each production process having its own model and corresponding control variables, one technical problem that arises is that of optimizing and adjusting the prediction outputs (such as productivity and efficiency) of a system that includes multiple such processes. Particularly, a technical problem can arise in case of a large system, including a number of subsystems/processes (e.g., 5 or more processes), with different possible options of control variables over a defined time horizon. The relationship between inputs and output in each of these subsystems or processes can be based on respective regression models. Thus, a complex relationship can exist between various setpoints, material inflows, and throughput within the production system.

Conventionally, a regression optimization service is an artificial intelligence (AI) solution for planning and decision optimization of a production process in a context of a heavy industry application. It can use data-driven techniques for real-time control and/or process planning in industrial processes, rather than state-of-the-art methods that rely on model-predictive, control-based techniques. Examples of manufacturing systems or industrial systems for which this approach can be used to optimize setpoints include a blast furnace, ball mill for cement grinding, crude oil processing, liquor refining and balancing, and pulp refining and production. However, the existing approach to regression-optimization does not have the capability to handle, for instance, multiplication of a control variable with one or more observed variables, which can occur in a number of manufacturing applications.

One or more embodiments of the present invention address the need to capture production process relationships expressed through physics-based models within such a manufacturing system, and in particular, where one or more observed input variables of a production process can dynamically change over time and one or more terms of the physics-based expression are a function of two or more input variables of multiple input variables of the production process.

By way of example, a production process can have an output (y) and inputs that include secondary variables (z), primary variables (x), and observed variables (o). Secondary variables are those that are due to a different upstream process, and are controllable through a proportional-integral-derivative (PID) controller. Primary variables are those that are external controls for a process, and hence, can be controlled through a PID controller as well. Observed variables are those that cannot be controlled, but do affect the output of the production process. Consider a scenario where an industrial process cannot accurately be modeled through a machine-learning-based linear relationship between its inputs and outputs. This can occur where the underlying physical and/or chemical relationship is governed by an algebraic expression that may be complex and non-linear among the inputs. For instance, the expression can be a fraction and a multiplication among the input variables. In one or more embodiments, the optimization framework for the regression optimization model can be a mixed integer linear program (MILP), and hence, the optimization model requires the constraints to be linear.

To linearize a non-linear, physics-based relationship between the production process inputs and output, the output is constructed herein as a linear relationship among the input variables using a dynamic linear model, where the parameters in the linear model are coefficients or weights (w), and a bias (b). The coefficients and bias can be a variety of expressions where, for instance, an expression can be a fraction where the numerator is the sum of the products of certain numbers and/or observed variables, and the denominator is also of the sum of the products of certain numbers and/or observed variables. As a result, the dynamic linear model with the defined coefficients and bias terms is expressed linearly with respect to secondary and primary variables with dynamically changing observed variables.

Figure 4:
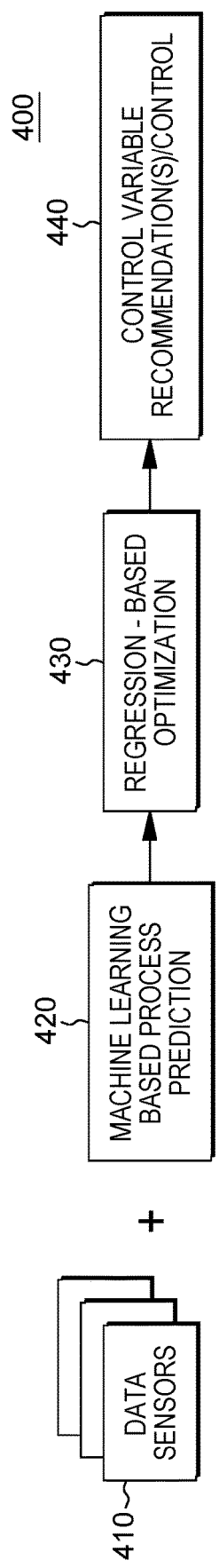
FIG. 4 depicts a schematic of one embodiment of a regression-optimization control workflow for a production process of a manufacturing system, in accordance with one or more aspects of the present invention.
Figure 5A:
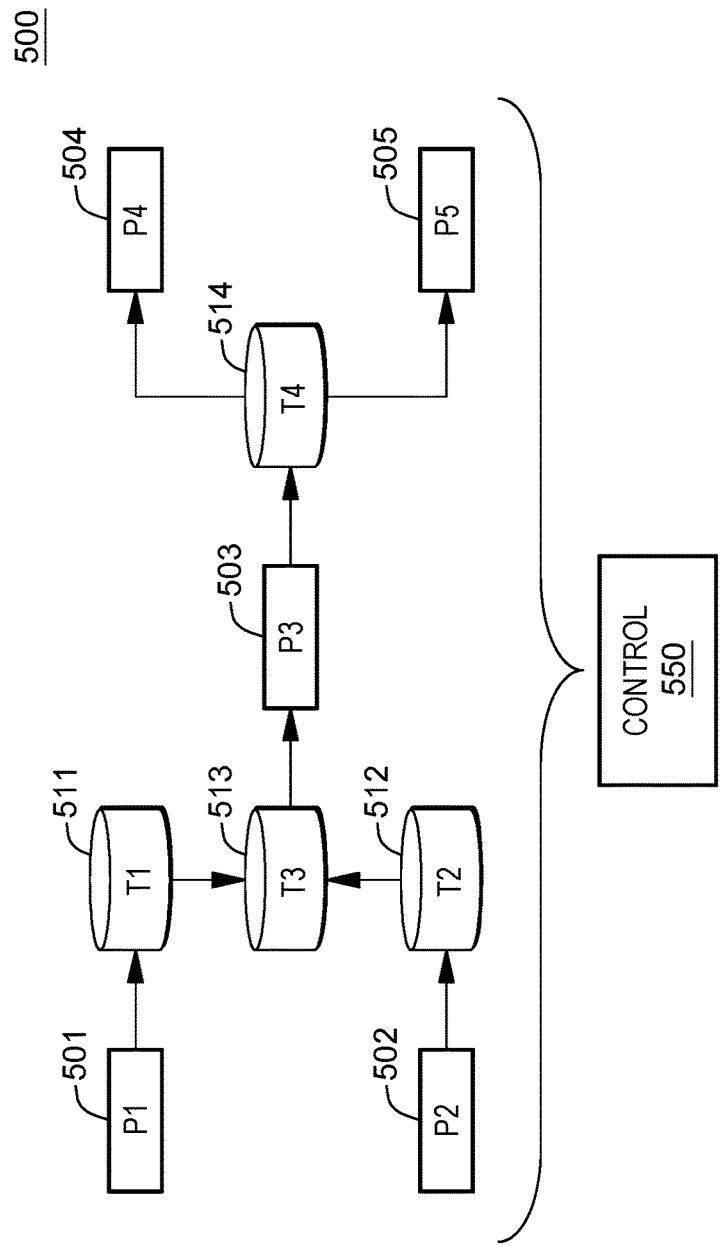
FIG. 5A depicts a block diagram of an example manufacturing system scenario used to facilitate explanation of one or more embodiments of the present invention.
Figure 5B:
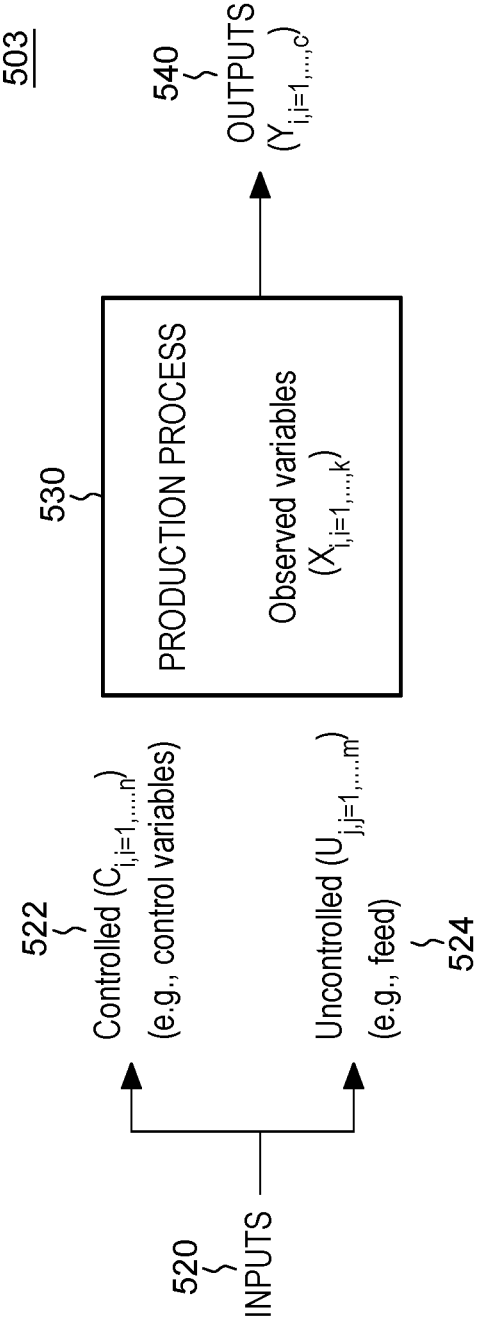
FIG. 5B is a depiction of a production process as a model to be implemented in accordance with one or more embodiments of the present invention.
Figure 5C:
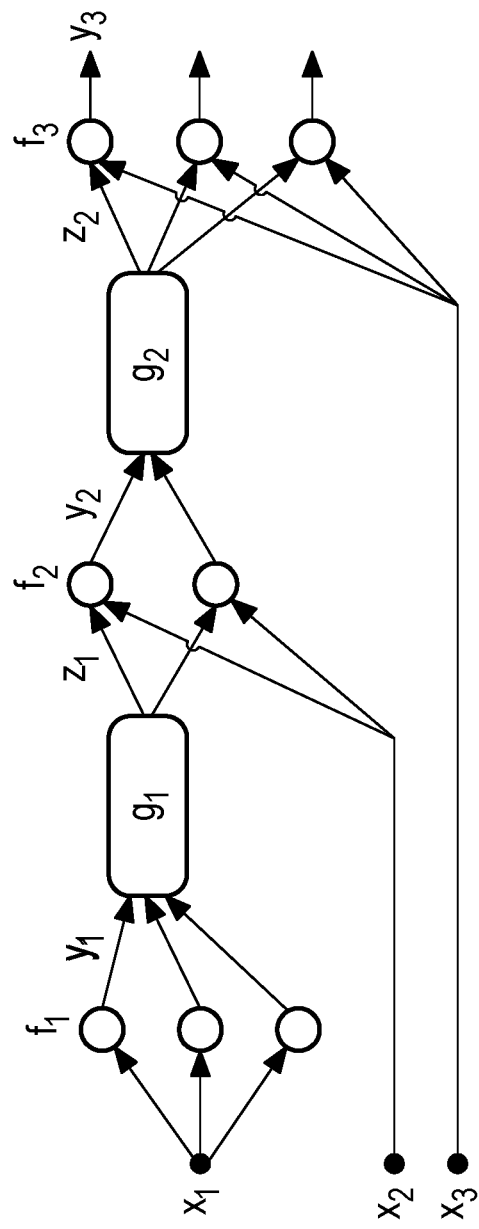
FIG. 5C depicts an example network representation of the manufacturing system example of FIG. 5A, depicting one production process to be controlled, in accordance with one or more aspects of the present invention.
Figure 6:
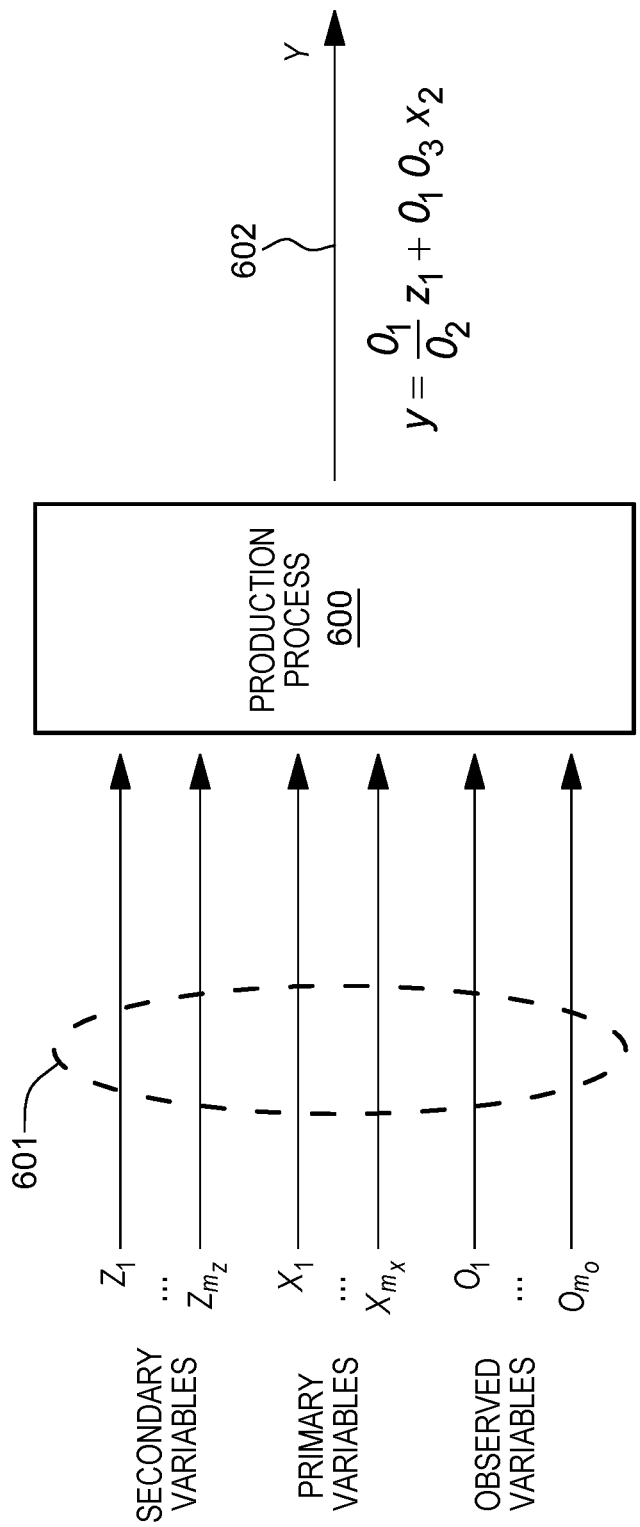
FIG. 6 is a representation of a production process of a manufacturing system with a complex dependency of input variables, which is to be controlled, in accordance with one or more aspects of the present invention.

FIGS. 4-6 further illustrate regression-optimization processing and FIGS. 7A-10B illustrate regression-optimization control of production processes with one or more complex physics-based expressions and/or one or more dynamically changing input variables, in accordance with one or more aspects of the present invention.

By way of example, FIG. 4 depicts a block diagram of data-driven, regression-optimization of a cognitive process control, generally denoted 400. As illustrated, a plurality of data sources obtain relevant process data, such as runtime input data for multiple input variables of a production process of a manufacturing system with one or many production processes. For instance, in one or more embodiments, hundreds, thousands or hundreds of thousands of data tags or datapoints can be obtained every minute, hour, day, etc., with a vast amount of information being generated over a longer period of time, such as a year. In one approach, the data sensors can provide runtime input data to one or more machine learning models, which can be trained to provide machine-learning-based process prediction(s) 420. The process prediction(s) are fed to a regression-based optimization component 430, which can optimize the process for one or more manufacturing objectives to be met. In one or more embodiments, regression-based optimization 430 can, for instance, provide recommendations on control variables such as flows, setpoints, inventory levels, etc., to optimize throughput, product delivery, etc. In addition, in one or more embodiments, the regression-based optimization component can provide, for instance, an optimal recovery plan for the production process and/or scenario analysis for various operating conditions of the process.

As a specific example, multi-period, site-wide regression-optimization at a processing plant, such as (for instance) a pulp processing plant, might be desired in one application. A process flow diagram can be used to generate a time-index graphical representation of the manufacturing system, which can include a network of multiple production processes, plants, nodes, etc., each having a self-contained set of inputs and outputs. Further, in practice, the output from an upstream production process can become an inflow to a downstream production process, and for certain processes, the output of a downstream process can be an input (i.e., the process loops), depending on the implementation. In certain implementations, process dynamics can constitute process lags, and a complex relationship can exist between the various setpoints, material inflows, and throughput. Within this context, there is a need to capture relationships, expressed through physics-based models, for incorporation into an optimization model or process.

FIG. 5A depicts a block diagram of an example production or manufacturing system which can be used to further understand one or more issues addressed by the present invention. In this example, manufacturing system 500 includes a network of multiple production processes P1-P5 501-505, and multiple storage tanks T1-T4 511-514, where storage tanks T1 511 and T2 512 denote intermediate storage tanks, and storage tank T3 513 stores product from both storage tank T1 511 and storage tank T2 512. Processes P1 501 and P2 502 can be extraction processes to extract a material for storage in the storage tanks. Process P3 can be an upgrading process to produce a product from the material in storage tank T3 513, which is stored in storage tank T4 514. This is a further intermediate product that can be further processed by processes P4 504 and P5 505, which can be parallel upgrade processes that produce, for instance, a different quality of material from the intermediate material in storage tank T4 514.

As illustrated, manufacturing system 500 includes a network of multiple production processes (e.g., process plants), with each process having a respective set of inputs and outputs. The outflows from an upstream process become an inflow to a downstream process. Within the system, a complex relationship can exist between the various setpoints, material inflows, and the final throughput of the system 500. The final throughput in the example embodiment is the output of process P4 504 and process P5 505 together, in one example. In one or more aspects, a production process of system 500 can be dynamic, for instance, due to events such as scheduled maintenance, unexpected breakdowns, shifting economic objectives under which the system 500 is operated, etc.

According to one or more embodiments, manufacturing system 500 can be controlled by a control or controller 550 by configuring (e.g., via a PID controller(s)) one or more control variables in one or more of the production processes P1-P5. In one or more embodiments, control 550 can be a computer-implemented control, such as a computer program product control implemented on a server computer, tablet computer, laptop computer, desktop computer, or any other type of computing resource.

Depending on the implementation, control 550 can access runtime data and/or historical data of one or more variables of a production process in the manufacturing system 500. For example, a historical data span can cover a period of years, with the historical data containing sensor measurements and production outputs for each production process in the manufacturing system. Under such scenarios, control 550 can generate an optimization model for the manufacturing system 500. The optimization model can provide a set of recommendation on control setpoints for automated control of the manufacturing system, such as, for instance, product weight, volume, or other metric, upgrading feed rates, etc., that optimize a particular production process, such as a synthetic crude oil (SCO) production process (in another example), while maintaining desired levels of intermediate products in the storage tanks, based on certain operational constraints.

The optimization model can be configured to optimize the manufacturing system 500 at a site-wide level spanning the multiple production processes. One solution is to address technical problems with such optimization using non-linear models based on physical principles (e.g., thermodynamics) for each process, and coupling the models via flow and material balance equations. Alternatively, or in addition, another solution would be to combine physical modes and data-driven models.

According to one or more embodiments, the optimization model can be configured to address system-wide prediction optimization for a production process. The optimization model can be devoted to maximizing, for instance, flow throughput of end product by seeking an optimal production flow over a specified time horizon with operational constraints (e.g., storage inventories or other targets). Machine learning can be used in certain implementations to model complex processes (e.g., for production or enterprise-level control) from data facilities to improve operations measure in terms of productivity, throughput, efficiency, and/or resource utilization. In such a setting, pipelines for analysis include a machine learning step to build prediction models for each output followed by an optimization procedure to derive the optimal setpoints for the entire process. Accordingly, one or more embodiments facilitate techniques to model and optimize operations for production process-level processing, as well as manufacturing system-level processing by, for instance, generating setpoint recommendations for one or more subsystems or production processes in the system. In the example of FIG. 5A, the subsystems can include the production processes, plants, etc., and/or storage tanks. Advantages provided by one or more embodiments of the present invention include providing the ability to act on events in near-real-time across an entire manufacturing system for enterprise operations management.

By way of further example, FIG. 5B is a visual depiction of production process P3 503 as a model, according to one or more embodiments. It is understood that this is only one possible example, and that in other embodiments, the model can include different parameters. The production process 530 can be modeled as a collection of variables $(X_i)$ that cause inputs 520 to result in an output $(Y_i)$ 540. The variable(s) $X_i$ are the result of determining a regression function representing the process performed by the production process P3 503, in this case. The inputs 520 can include control variables $(C_i)$ 522 that are used to configure the production process, as well as other input variables that are not controlled by the control 550 (FIG. 5A). For example, such uncontrolled variables $(U_j)$ 524 can be observed variables, such as an amount of product feed. It is understood that the representation of the subsystem can be different than that depicted in FIG. 5B in other embodiments of the invention, and/or depending on the manufacturing system being modeled. It should be noted that X, U, C, and Y are vectors of values, in one or more embodiments.

In one or more embodiments, manufacturing system 500, especially when it is an engineered system, can operate in a steady state mode. A "steady state mode" can be defined as a state when the system 500 has equilibrated (in a temporal sense), and the rate of change of state variables is substantially zero. In practice, a complex, non-linear dynamical system, such as system 500, can have multiple steady states, and operationally the system 500 can be operated around a few of these steady state points (also called operating modes). For example, industrial plants often operate at different levels of throughput due to, for instance, preventive maintenance or economic reasons.

In a steady state approach, control 550, when generating an optimization model, considers the transient changes and control variable changes to happen much slower than the timescale of optimization, and only one operating mode may be used for the entire time period. Hence, a static, steady state model can be used in many implementations for each production process at each time period, which can correspond to an operating mode. Accordingly, in one or more aspects, regression models can be built that provide a functional relation between the targets against the inputs. The choice of regression functions can be diverse, including linear regression, non-smooth models (e.g., decision tree), highly non-linear and complex neural networks, and black box models (e.g., random forest).

One method used can include determining interactions between different production processes in the manufacturing system, such as when they operate at a stationary point. In one example, this can be performed by determining interactions between the corresponding models of the subsystems. In one or more embodiments, the manufacturing system can be modeled as one or more process flows of the production processes as, for instance, a directed multi-layered network of subsystems.

FIG. 5C depicts an example network representation for system 500 of FIG. 5A, in accordance with one or more embodiments. The network representation of FIG. 5C depicted visualizes the system as a hierarchy structure with L layers having upstream-downstream operation relations. In one or more embodiments, each of the layers can be implemented as a layer in a machine learning algorithm, such as an artificial neural network (ANN), for example, a deep neural network (DNN), a conventional neural network (CNN), or the like.

In FIG. 5C, a circular node in a layer of the network represents a production process (i.e., a subsystem), where a regression function $(f_i)$ is to be built. A rectangular node represents all operational constraints, such as maintaining inventory levels and limits on the adjustment of control variables from the preceding time period. The relationship in these rectangular nodes are linear in one example.

The vector-valued regression function for each of the subsystems can be determined in this instance using certain known techniques. For example, the regression function for a production process in the lth layer that is determined from historical data can be expressed as:

$$f_l: (z_{l-1}, x_l) \in R^{k_{l-1}+m_l} \to y_l \in R^{n_l}$$

Here, $x_l \in R^{m_l}$ and $z_{l-1} \in R^{k_{l-1}}$ denote the controllable variables (e.g., setpoints) 522 and uncontrollable variables (e.g., the inflow from the previous process) 524 for $f_l$. The vector $y_l \in R^{n_l}$ denotes the outputs. Here, the assumption is that $k_0 = 0$; that is, the decision variables for the first layer of the ANN are only setpoints. Now, if θ represents the objective function for the system 500, a goal is to find optimal setpoints $x_l$ and flow rates ($y_l$, $z_l$) to maximize production or some target variable. A single-period problem can be written as the following constrained optimization problem:

$$\begin{aligned} \min_{x} \phi(y_l), \text{ such that} \\ y_1 = f_1(x_l), \\ y_l = f_l(z_{l-1}, x_l) \forall l = 2, \ldots, L, \\ A_l y_l + B_l z_l \leq b_l, \forall l = 1, \ldots, L-1, \\ \underline{x_l} \leq x_l \leq \overline{x_l}, \forall l = 1, \ldots, L \end{aligned}$$

where $X = (x_1, \ldots x_L, y_1, \ldots y_L, z_1, \ldots, z_L)$, and the objective function $\theta(y_L)$ depends on the output at the last layer. In the above, $f_l$ represents the regression functions that model each of the subsystems in the system 500; x are primary control variables (e.g., for the processes P1-P5); z are secondary control variables (e.g., for the storage tanks T1-T4); and y are the state variables.

Here, $\underline{x_l}$ and $\overline{x_l}$ are defined as upper and lower bonds on the primary control variables. The regression model is cognizant of operational domain constraints. Model parameter matrices, $A_l$, and $B_l$ and vector $b_l$ are used to capture interactions between nodes within two consecutive layers. One example for an operational constraint to be included in $A_l y_l + B_l Z_l \leq b_l$ is the tank storage constraint for tank T3 on the system 500 of FIG. 5A.

As noted, addressed herein is regression-optimization control of a production process with one or more dynamically changing inputs. Further, the production process can be one production process of many production processes of a manufacturing system. Within the production process, one or more observed variables can themselves be a function of several other observed variables. Disclosed herein is a process for embedding such a complex, multi-step function or expression, derived from one or more physics-based relationships, into an optimization model, such as a mixed integer linear program (MILP)-based optimization model to determine optimal values of one or more control variables that, for instance, maximize process performance, maximize output, etc., subject to multiple observed variable values.

As described, in one or more embodiments, computer-implemented methods, computer systems and computer program products are provided herein which include program code that accepts dynamic inputs in a regression optimization process for production process control and/or manufacturing system control. For example, consider another specific example, where there is a multi-effect evaporation process in pulp processing. Within such a manufacturing process, weak black liquor flows into evaporators effect 2-6 with inorganic pulping chemicals and wood components, at a dry solids content between 14%-18% by weight, in one example, Within the evaporator, black liquor rises up to the heat exchanger to produce steam in the vapor dome, that is pulled by vacuum into the next effect. Four to five tons of water can be evaporated per air-dried ton of pulp produced. Further, concentrated black liquor typically has a 60%-85% by weight dry solids content. Within this manufacturing system, a production process, such as at the evaporator, can have a complex, physics-based relationship between inputs and outputs that do not lend themselves to a machine learning-based regression analysis. Note that as used herein, the phrase "physics-based relationship" refers to one or more underlying physical and/or chemical relationships within a production process governed by, for instance, an algebraic expression that can be complex and non-linear among the inputs.

An example of this is depicted in FIG. 6, where a production process 600 of a manufacturing system includes multiple input variables 601 including, for instance, observed variables $O_1$-$O_{m_o}$, primary variables $X_1 \ldots X_{m_x}$, and secondary variables $Z_1 \ldots Z_{m_z}$, where the output 602 can be represented by complex physics-based expression, such as the following equation:

$$y = \frac{O_1}{O_2} z_1 + O_1 O_3 X_2$$

Existing regression functions of regression-optimization tools, services, models, cannot handle a relationship such as noted above due to the complex dependency of the input observed variables to other variables, such as to other primary and/or secondary variables. Note that the primary and secondary variables of the FIG. 6 embodiment are control variables, where the observed variables are uncontrolled variables.

As described, one approach to addressing the above problem is to fit a regression model with fixed coefficients which represent the initial value of the observed or controlled variables. The drawback to this approach is that a model would need to be retained for every scenario, based on the initial condition changes. Another approach, disclosed herein, is to use a dynamic linear model, where coefficients and bias terms can be dependent on other control and/or other observed variables. In this manner, as inputs dynamically change, the dynamic linear model dynamically changes. By providing the dynamic linear model with linearized coefficient and bias terms in an optimization model, a dynamically adaptable regression-optimization model is generated, which can be used to determine an optimized value of a control variable for the production process.

As noted, for certain production processes, the output of a downstream process is also an input (i.e., a process can loop back). Further, process dynamics can constitute process lags, and a complex relationship can exist between the various setpoints, material inflows, and the throughput. In one or more embodiments, each observed or input variable can itself be a function of several other observed variables. The complex relationships of the process can be expressed through one or more physics-based models or expressions that capture the underlying physics-based relationships between the multiple input variables.

In one or more embodiments disclosed herein, computer-implemented methods, computer systems and computer program products are provided, which include program code that when executed, implements a new type of regression function, referred to herein as a dynamic linear model, to enable a regression-optimization asset to consume a class of physics-based relationships, where the coefficients and bias terms can be dependent on other control variables and/or other observed variables. In one or more embodiments, one or more, or each, control and/or observed variable of a production process, within the expression for a coefficient or a bias term could change from one production process run to another production process run. Therefore, the regression relationship is considered "dynamic" and unlike a static one considered by the above-described machine learning approaches to regression analysis. Proposed herein is an approach to incorporate the non-linear relationships of such a production process into an optimization model, such as a mixed integer linear programming-based (MILP) optimization model for a single process, as well as for system-wide-level processing.

In one or more implementations, a dynamic linear model can be expressed as noted in equation (1):

$$y = w_1 x_1 + \ldots + w_d x_d + b \quad (1)$$

where:
y is an output value;
$w_1 \ldots w_d$ are coefficient terms;
$x_1 \ldots x_d$ are primary or secondary variables (i.e., control variables); and
b is a bias term.

The coefficient terms $w_i$, i=1 . . . d, and bias term can be transformed into the following fractional format:

$$\frac{[(a_{1,1} \cdot \ldots \cdot a_{1,k}) + \ldots + (a_{l,1} \cdot \ldots \cdot a_{l,k})]}{[(b_{1,1} \cdot \ldots \cdot b_{1,m}) + \ldots + (b_{n,1} \cdot \ldots \cdot b_{n,m})]} \quad (2)$$

where:
$\{a_{i,j}\}_{i=1,\ldots,l; j=1,\ldots,k}$ and $\{b_{i,j}\}_{i=1,\ldots,n; j=1,\ldots,m}$ are one of a number, an index of a respective input variable, or a dictionary of the equation (2) fraction, with l, k, n, and m being positive integers.

By way of example, physics-based expressions can be provided by the manufacturer and/or first-principle-based methods. In other words, the physics-based expression to be reformulated or converted as discussed herein is assumed to be a given expression, as are the inputs to the production process. Within this context, consider a process where the relationship between the output and inputs can be expressed by y=x1×x2/o1+5×o2, where x1 and x2 are control variables, and o1 and o2 are observed variables. In this case, there is a choice of using either (x1/o1) as the weight and x2 the variable term or (x2/o2) as the weight and x1 as the variable term. The second term contains only an observed variable (o2), and it is equivalent to a bias term. Bias terms have only observed variables in them. Using this approach, the provided physics-based expression can be mapped to the dynamic linear model expression, such as equation (1) using the fractional format of equation (2).

Those skilled in the art will note that the transformation or reformulation of terms such as discussed herein can cover a wide range of algebraic expressions. FIGS. 7A & 7B depict two examples of such expressions. In these examples, FIGS. 7A & 7B illustrate converting a term 700, 700' in a physics-based expression (or complex relationship or first principle relationship) which is not linear into a format 701, 701' that can be used in embedding or integrating the regression expression into an optimization model. In the examples, the complex relationship received as input is linearized to frame the coefficient and bias terms in a format that can be added into the optimization model. Again, FIGS. 7A & 7B represent two examples only of linearizing a complex expression of a term obtained, for instance, from a physics-based expression of a production process of a manufacturing system. Note that the coefficient term in the reformulated expression should be in the form of equation (2). That is, the term should be expressed in a form such that each term in the numerator and denominator can be decomposed into one of: a constant×(an observed input variable), a product of two or more observed input variables, or a constant×(a product of two or more observed input variables). This decomposition is significant so that the process described herein can happen. The expressions 700, 700' of FIGS. 7A & 7B do not allow this decomposition to happen. Hence, the decomposed expression 701, 701' is derived from the original expressions. The reformulated expressions are referred to herein as "specific expressions" or "regular expressions", as the expressions follow the fractional format of equation (2).

Note that the format of the coefficients and bias terms can vary. For instance, the coefficient and/or bias terms can have the following format: a number; an index of an input (e.g., [p]); or a dictionary of a fraction. A dictionary of a fraction can be represented as:

$$dict = \{\text{'numerator'}: num, \text{'denominator'}: den\}$$

where:

$$num = [[a_{1,1}, \ldots, a_{1,k}], \ldots, [a_{l,1}, \ldots, a_{l,k}]]$$
$$den = [[b_{1,1}, \ldots, b_{1,m}], \ldots, [b_{n,1}, \ldots, b_{n,m}]]$$

for the fraction:

$$\frac{[(a_{1,1} \cdot \ldots \cdot a_{1,k}) + \ldots + (a_{l,1} \cdot \ldots \cdot a_{l,k})]}{[(b_{1,1} \cdot \ldots \cdot b_{1,m}) + \ldots + (b_{n,1} \cdot \ldots \cdot b_{n,m})]}.$$

To summarize, for a given production process, the input variables and output(s) are identified, as well as identifying which inputs are controllable and which are observed variables. A physics-based expression of the process that connects the inputs and outputs is obtained, and coefficient and bias terms are identified. For each coefficient and bias term, the term is reformulated into the fractional expression described above, as in the examples of FIGS. 7A & 7B. In one or more embodiments, the expression can be formulated programmatically using a dictionary of coefficient and bias terms. Each coefficient (or bias) term contains a number (denoting the index of the coefficient term), and a dictionary of numerator and denominator. The numerator and denominator contain a list of constant and indexes of input variables that are part of the coefficient (or bias) term. Examples of this are depicted in FIGS. 8-9B.

FIG. 8 depicts one embodiment of converting a dictionary of a fraction to a number using the above example. In particular, the above-numerator and denominator are converted to the fraction represented by equation (2). FIGS. 9A & 9B depict one example of converting obtained coefficient and bias into program code, such as Python® code. Python is a registered trademark in one or more jurisdictions of Python Software Foundation, a Delaware state corporation.

At runtime, the value of the observed variables captured by the process control system can be read-in, through a data aggregator, into a programmatically-generated configuration file. When the dynamic linear model is read-in by the optimization service or model, the observed input variable values are effectively substituted in the coefficient and bias dictionaries, thereby leading to a linear expression connecting the inputs and outputs of the production process. An example of this is shown in FIGS. 9A & 9B. By way of example, each of the coefficient (or weight) terms $w_1 \ldots w_5$ and the bias term is a complex algebraic expression containing one or more input variables $w_1 \ldots w_5$, as defined in FIG. 9A. At runtime, the output equation shown in FIG. 9A is read-in by the optimization model. For this, the coefficients and bias terms can be stored, in one embodiment, in a Python pickle format. To do so, two Python directories are created, one for the coefficient terms and the other for the bias terms. The numerator and denominator of each of the 5 coefficient terms of FIG. 9A is recorded into the coefficient dictionary. The numerator and denominator are recorded as Python lists containing the constant term and the index of the input variable. The same procedure is followed for the bias term, as illustrated by the code of FIG. 9B.

Figure 10A:
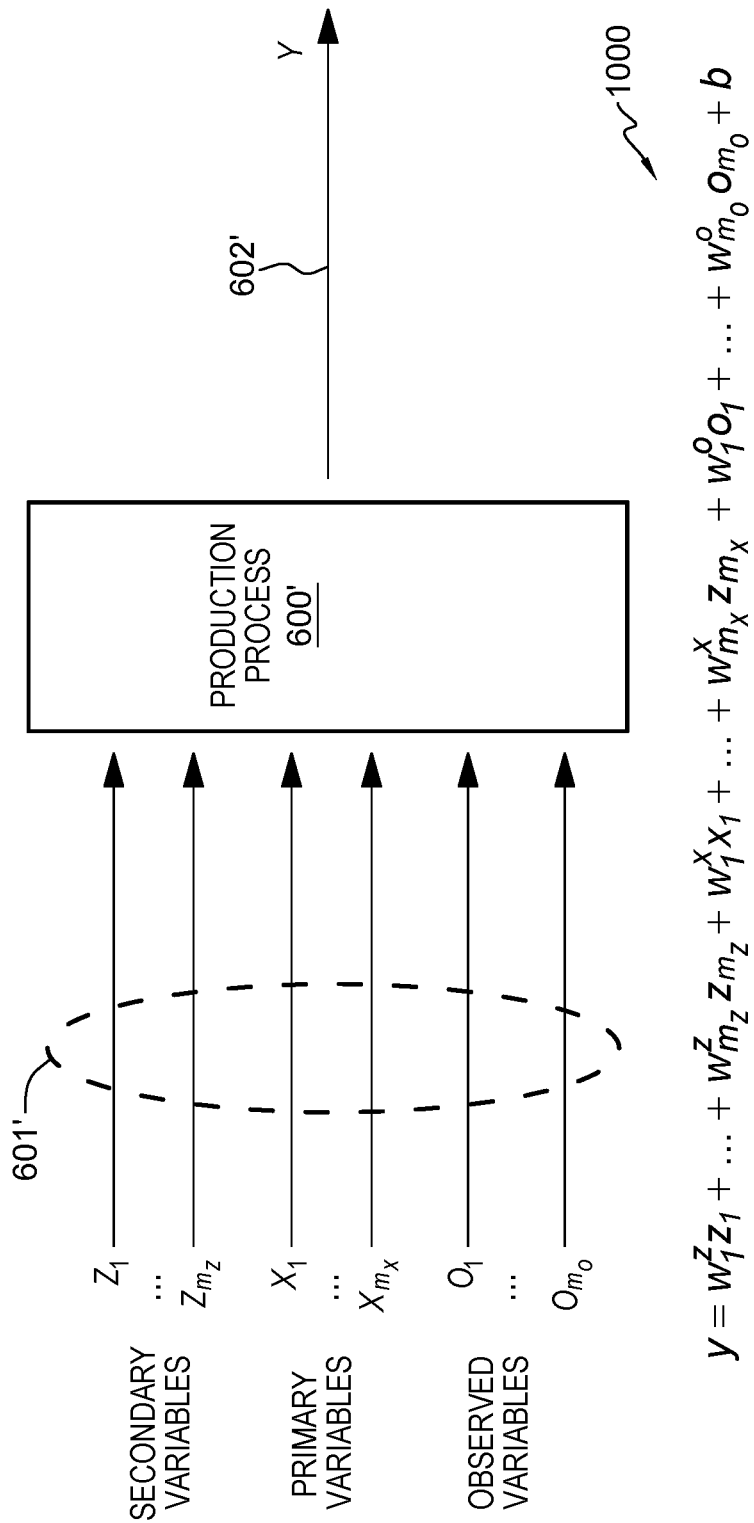

In one or more embodiments, the configuration file is used to record initial values (for control variables) and observed variable values at the start of the optimization run. The optimization may provide recommendations and/or control points that should be chosen or implemented for control variables over a defined window of time to, for instance, maximize throughput or yield of a production process. The recommendation/control should respect current values when providing the recommendation/control points or values. The observed variable values are assumed to remain fixed (hence, they are not called control variables) during the recommendation or control period. When the dynamic linear model is read-in by the optimization model at runtime, the observed variable values need to be passed on to the optimization model. The configuration file handles this task. Data aggregation is necessary in order to connect the data residing in the database (e.g., datalake) to the correct variable names in the dynamic linear model and optimization model. Additionally, one or more control or observed variables are to be derived from one or more sensor readings. For instance, the inflow into a process A might be the sum of two or more flows from a set of different upstream processes. The aggregated flow would need to be considered for process A input. The dynamic linear model 1000 would be as illustrated in FIGS. 10A & 10B. Note that, in one embodiment, the pickled dynamic linear model contains the coefficient and bias terms. This is unpickled at runtime by the optimization model. Simultaneously, the optimization code reads the configuration file to read-in the observed values of the observed variables. These values are stored in a list, for instance, a Python list, and used in place of the corresponding observed variables themselves, at runtime.

By way of further example, one implementation of a dynamic linear model can be expressed as:

```
class DynamicLinearModel:
    def __init__(self, weight_notation_dict, bias_notation_dict);
        self.weight_notation_dict = weight_notation_dict
        self.bias_notation_dict = bias_notation_dict
    # Convert product notation to value
    def __convert_product_value(self, value_prod, x):
    # Convert sum notation to value
    def __convert_sum_value(self, value_sum, x):
    # Convert the fraction notation to value
    def __convert_fraction_value(self, value_frac, x):
    # predict a vector
    def predict_single(self, x):
    # predict a matrix of vectors
    def predict(self, X):
```

In one embodiment, converting the fraction notation to a value can be represented in program code as:

```
# Convert the fraction notation to value
def __convert fraction_value(self, value_frac, x):
    if isinstance(value_frac, dict):
        numerator = self.__convert_sum_value(value_frac['numerator'], x)
        denominator =
        self.__convert_sum_value(value)frac['denominator'], x)
        fraction_falue = numerator / denominator
    elif (isinstance(value_frac, list) and (len(value_frac) == 1)):
        fraction_value = x[value_frac[0] - 1]
    else:
        fraction_value = value_frac
    return fraction_value
```

Further, converting the sum notation to a value can be implemented in code by:

```
# Convert sum notation to value
def __convert_sum_value(self, value_sum, x):
    sum_value = 0
    if not isinstance(value)sume, liest):
        sum_value = sum_value + value_sum
    elif (isinstance(value_sume, list) and (len(value_sum) == 1)):
        if not isinstance(value_sum[0], list):
            sum_value = sume_value + x[value_sum[0] - 1]
        else:
            sum_value = self.__convert_product_value(value_sume[0], x)
    elif (isinstance(value_sum, list) and (len(value_sum) > 1)):
        for i in range(len(value_sum)
            sum_value = sume_value + self.__convert_product_value(value_sum[i], x)
    return sum_value
```

In addition, the program code to convert a product notation to a value can be represented as:

```
# Convert product notation to value
def __convert_product_value(self, value_prod, x):
    product_value = 1
    if not isinstance(value_prod, list):
        product_value = product_value * value_prod
    elif (isinstance(value_prod, list) and (len(value_prod) == 1)):
```

-continued

```
    if not isinstance(value_prod[0], list):
        product_value = product_value * x[value_prod[0] - 1]
    else:
        product_value = product_value * x[value_prod[0][0] - 1]
elif (isinstance(value_prod, list) and (len(value_prod) > 1)):
    for i in range(len(value_prod)):
        if not isinstance(value(prod[i], list):
            product_value = product_value * value_prod[i]
        elif (isinstance(value(prod[i], list) and (len(value_prod[i]) == 1)):
            product_value = product_value * x[value_prod[i][0] - 1]
return product_value
```

In addition, the dynamic linear model can predict input, including predict a vector by program code, such as:

```
# predict a vector
def predict_single(self, x):
    coef_list = [ ]
    for i in range(len(self.weight_notation_dict)
        coef_ =
            self.convert_fraction_value(self.weight_notiation_dict[i +1], x)
        coef_list.append(coef_)
    coef = np.array(coef_list)
    bias = self._convert_fraction_value(self.bias_notation_dick[1], x)
    # Predict
    predict_value_single = np.dot(coef, x) + bias
    return predict_value_single, [coef, bias]
```

Also, in one or more embodiments, a matrix of vectors can be predicted using code such as:

```
# predict a matrix of vectors
def predict(self, X):
    predict_value_list = [ ]
    coef_all_list = [ ]
    bias_all_list = [ ]
    for j in range(len(X)):
        predict_value_single, coef_bias = self.predict_single(X[j])
        predict_value_list.append(predict_value_single)
        coef_all_list.append(coef_bias[0])
        bias_all_list.append(coef_bias[1])
    predict_value = np.array(predict_value_list)
    coef_all = np.array(coef_all_list)
    bias_all = np.array(bias_all_list)
    return predict_value, [coef_all, bias_all]
```

As noted, FIGS. 10A & 10B depict an example of the dynamic linear model with coefficient and bias terms which can be dependent on multiple observed dynamic variables, in accordance with one or more aspects of the present invention. This dynamic linear model expression is similar to that noted above, and includes input variables 601' that include primary and secondary control variables, as well as observed or uncontrolled variables, where the dynamic observed variables at a process node 600' can be dependent on other observed variables, as illustrated in FIG. 10B. If observed values change, then the coefficients and bias of the dynamic linear model, or linear regression model, adaptively change as well. In this manner, the regression function at a process node can be a dynamic linear model based on dynamic behavior of observed values. The dynamic linear model can also be used for the system-wide control process, where available technical methods, such as a mixed integer linear programming-based (MILP) optimization model, a gradient-based non-linear optimization (NLOpt) optimization model, or a derivative-free optimization (DFO) model from an existing system-level regression-optimization tool, can be adapted.

Those skilled in the art will note from the above description that provided herein are computer-implemented methods, computer systems and computer program products for facilitating control of a production process of a manufacturing system. The computer-implemented method includes receiving, by at least one processor, runtime input data from multiple input variables of the production process, where the production process represented, at least in part, by a physics-based expression, with at least one term of the physics-based expression being a function of two or more input variables of the multiple input variables of the production process. Further, the computer-implemented method includes determining, by the at least one processor based on the physics-based expression, coefficient and bias terms for a dynamic linear model connecting the multiple input variables of the production process to at least one output of the production process. The coefficient and bias terms of the dynamic linear model are based, at least in part, on input variables of the multiple input variables. Further, the computer-implemented method includes providing, by the at least one processor, the dynamic linear model with the determined coefficient and bias terms in an optimization model to generate a regression-optimization model which determines an optimized value of a control variable for the production process, and facilitating control, at least in part, of the production process using the determined optimized value of the control variable.

In one embodiment, the computer-implemented method further includes obtaining the dynamic linear model from, at least in part, the physics-based expression, where the physics-based expression is a complex multi-step expression that connects the multiple input variables of the production process and the at least one output of the production process, and where at least one input variable of the multiple input variables is a dynamic input variable. Further, the providing includes embedding the dynamic linear model with the determined coefficient and bias terms in the optimization model.

In one embodiment, the optimization model is a mixed integer linear programming-based optimization model.

In one implementation, the dynamic linear model includes:

$$y = w_1^z z_1 + \ldots + w_{m_z}^z z_{m_z} + w_1^x x_1 + \ldots + w_{m_x}^x x_{m_x} + b$$

where:
$x_1 \ldots x_{m_x}$ are primary variables;
$z_1 \ldots z_{m_z}$ are secondary variables;
$w_1^z, w_{m_z}^z, w_1^x, w_{m_x}^x$, are dependent on observed variables, which can be of the following form:

$$\frac{[(a_{1,1} \cdot \ldots \cdot a_{1,k}) + \ldots + (a_{l,1} \cdot \ldots \cdot a_{l,k})]}{[(b_{1,1} \cdot \ldots \cdot b_{1,m}) + \ldots + (b_{n,1} \cdot \ldots \cdot b_{n,m})]}$$

where:
$\{a_{i,j}\}_{i=1,\ldots,l;j=1,\ldots,k}$ and $\{b_{i,j}\}_{i=1,\ldots,n;j=1,\ldots,m}$ are from a group consisting of: a number; an index of a respective input variable; and a dictionary of the above fraction, with l, k, n, and m being positive integers.

In one or more embodiments, the at least one term of the physics-based expression is a function of two or more observed input variables of the multiple input variables of the production process.

In one embodiment, determining, by the at least one processor based on the physics-based expression, coefficient and bias terms of the dynamic linear model includes mapping of the physics-based expression to the dynamic linear model.

In one embodiment, the determining includes converting terms of the physics-based expression into a specified expression, where the specified expression has a numerator and a denominator, and where each term can be decomposed into a defined form, the defined form being selected from a group consisting of: a constant×(an observed input variable); a product of two or more observed input variables; and a constant×(a product of two or more observed input variables).

In one implementation, one or more input variables of the multiple input variables of the production process change from one production run to another production run of the production process, resulting in one or more of the coefficient and bias terms of the dynamic linear model changing dynamically from one production run to the other production run.

Further, providing, by the at least one processor, the dynamic linear model with the determined coefficient and bias terms in the optimization model can include, in one or more embodiments, reading-in at runtime the dynamic linear model with the determined coefficient and bias terms into the optimization model to generate the regression-optimization model which determines the optimized value of the control variable for the production process.

In one or more further aspects, a computer-implemented method, computer system and computer program product implement a process for regression-optimization for managing or controlling one or more inputs in a production manufacturing process, where the process includes receiving, at a processor or computer, data input from a plurality of product processes, each product process having an input and an output, and being codependent on inputs and/or outputs of other processes of the plurality of processes. In addition, the process includes using as a regression function a dynamic linear model to generate a regression-optimization model for a product process of the product processes, where the dynamic linear model includes, for instance, coefficients and bias terms dependent on variables from other product processes of the plurality of product processes. The regression-optimization model captures when one or more of the coefficients and/or bias terms change with a plurality of product process runs for each of the product processes. In one embodiment, an optimization digital model is generated for a product process based on the regression-optimization model to facilitate the control of the product process.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating control of a production process of a manufacturing system, the computer-implemented method comprising:
   receiving, by at least one processor, runtime input data for multiple input variables of the production process, the production process represented, at least in part, by a physics-based expression, with at least one term of the physics-based expression being a function of two or more input variables of the multiple input variables of the production process;
   determining, by the at least one processor based on the physics-based expression, coefficient and bias terms for a dynamic linear model connecting the multiple input variables of the production process to an output of the production process, the coefficient and bias terms of the dynamic linear model being based, at least in part, on input variables of the multiple input variables;
   providing, by the at least one processor, the dynamic linear model with the determined coefficient and bias terms in an optimization model to generate a regression-optimization model which determines an optimized value of a control variable for the production process; and
   facilitating control, at least in part, of the production process using the determined optimized value of the control variable.

2. The computer-implemented method of claim 1, further comprising:
   obtaining the dynamic linear model from, at least in part, the physics-based expression, the physics-based expression being a complex multi-step expression that connects the multiple input variables of the production process and the output of the production process, where at least one input variable of the multiple input variables is a dynamic input variable; and
   wherein the providing comprises embedding the dynamic linear model with the determined coefficient and bias terms in the optimization model.

3. The computer-implemented method of claim 1, wherein the optimization model can be solved by using methods from the group consisting of: mixed integer linear programming-based (MTLP) methods, gradient-based non-linear optimization (NLOpt) methods, and derivative-free optimization (DFO methods.

4. The computer-implemented method of claim 1, wherein the dynamic linear model comprises:

$$y = w_1^z z_1 + \ldots + w_{m_z}^z z_{m_z} + w_1^x x_1 + \ldots + w_{m_x}^x x_{m_x} + b$$

where:
- $x_1 \ldots x_{m_x}$ are primary variables;
- $z_1 \ldots z_{m_z}$ are secondary variables;
- $w_1^z, w_{m_z}^z, w_1^x, w_{m_x}^x$, are dependent on observed variables, which can be the following form:

$$\frac{[(a_{1,1} \cdot \ldots \cdot a_{1,k}) + \ldots + (a_{l,1} \cdot \ldots \cdot a_{l,k})]}{[(b_{1,1} \cdot \ldots \cdot b_{1,m}) + \ldots + (b_{n,1} \cdot \ldots \cdot b_{n,m})]}$$

where:
- $\{a_{i,j}\}_{i=1,\ldots,l; j=1,\ldots,k}$ and $\{b_{i,j}\}_{i=1,\ldots,n; j=1,\ldots,m}$ are from a group consisting of: a number; an index of a respective input variable; and a dictionary of the above fraction, with l, k, n, and m being positive integers.

5. The computer-implemented method of claim 1, wherein the at least one term of the physics-based expression is a function of two or more observed input variables of the multiple input variables of the production process.

6. The computer-implemented method of claim 1, wherein determining, by the at least one processor based on the physics-based expression, coefficient and bias terms of the dynamic linear model includes mapping the physics-based expression to the dynamic linear model.

7. The computer-implemented method of claim 1, wherein the determining comprises converting terms of the physics-based expression into a specified expression, the specified expression having a numerator and a denominator where each term can be decomposed into a defined form, the defined form being from a group consisting of: a constant×(an observed input variable); a product of two or more observed input variables; and a constant×(a product of two or more observed input variables).

8. The computer-implemented method of claim 1, wherein one or more input variables of the multiple input variables of the production process change from one production run to another production run of the production process, resulting in one or more of the coefficient and bias terms of the dynamic linear model changing dynamically from the one production run to the other production run.

9. The computer-implemented method of claim 1, wherein providing, by the at least one processor, the dynamic linear model with the determined coefficient and bias terms in the optimization model includes reading in at runtime the dynamic linear model with the determined coefficient and bias terms into the optimization model to generate the regression-optimization model which determines the optimized value of the control variable for the production process.

10. A computer system for facilitating control of a production process of a manufacturing system, the computer system comprising:
- a memory; and
- at least one processor in communication with the memory, wherein the computer system is configured to perform a method, said method comprising:
  - receiving, at the at least one processor, runtime input data for multiple input variables of the production process, the production process represented, at least in part, by a physics-based expression, with at least one term of the physics-based expression being a function of two or more input variables of the multiple input variables of the production process;
  - determining, by the at least one processor based on the physics-based expression, coefficient and bias terms for a dynamic linear model connecting the multiple input variables of the production process to an output of the production process, the coefficient and bias terms of the dynamic linear model being based, at least in part, on input variables of the multiple input variables;
  - providing, by the at least one processor, the dynamic linear model with the determined coefficient and bias terms in an optimization model to generate a regression-optimization model which determines an optimized value of a control variable for the production process; and
  - facilitating control, at least in part, of the production process using the determined optimized value of the control variable.

11. The computer system of claim 10, further comprising:
obtaining the dynamic linear model from, at least in part, the physics-based expression, the physics-based expression being a complex multi-step expression that connects the multiple input variables of the production process and the output of the production process, where at least one input variable of the multiple input variables is a dynamic input variable; and
wherein the providing comprises embedding the dynamic linear model with the determined coefficient and bias terms in the optimization model.

12. The computer system of claim 10, wherein the dynamic linear model comprises:

$$y = w_1^z z_1 + \ldots + w_{m_z}^z z_{m_z} + w_1^x x_1 + \ldots + w_{m_x}^x x_{m_x} + b$$

where:
- $x_1 \ldots x_{m_x}$ are primary variables;
- $z_1 \ldots z_{m_z}$ are secondary variables;
- $w_1^z, w_{m_z}^z, w_1^x, w_{m_x}^x$, are dependent on observed variables, which can be the following form:

$$\frac{[(a_{1,1} \cdot \ldots \cdot a_{1,k}) + \ldots + (a_{l,1} \cdot \ldots \cdot a_{l,k})]}{[(b_{1,1} \cdot \ldots \cdot b_{1,m}) + \ldots + (b_{n,1} \cdot \ldots \cdot b_{n,m})]}$$

where:
- $\{a_{i,j}\}_{i=1,\ldots,l; j=1,\ldots,k}$ and $\{b_{i,j}\}_{i=1,\ldots,n; j=1,\ldots,m}$ are from a group consisting of: a number; an index of a respective input variable; and a dictionary of the above fraction, with l, k, n, and m being positive integers.

13. The computer system of claim 10, wherein the at least one term of the physics-based expression is a function of two or more observed input variables of the multiple input variables of the production process.

14. The computer system of claim 10, wherein determining, by the at least one processor based on the physics-based expression, coefficient and bias terms of the dynamic linear model includes mapping the physics-based expression to the dynamic linear model.

15. The computer system of claim 10, wherein the determining comprises converting terms of the physics-based expression into a specified expression, the specified expression having a numerator and a denominator where each term can be decomposed into a defined form, the defined form being from a group consisting of: a constant×(an observed input variable); a product of two or more observed input variables; and a constant×(a product of two or more observed input variables).

16. The computer system of claim 10, wherein one or more input variables of the multiple input variables of the production process change from one production run to another production run of the production process, resulting in one or more of the coefficient and bias terms of the dynamic linear model changing dynamically from the one production run to the other production run.

17. A computer program product for facilitating control of a production process of a manufacturing system, the computer program product comprising:
 one or more computer-readable storage media and program instructions embodied therewith, the program instructions being readable by a processing circuit to cause the processing circuit to perform a method comprising:
  receiving runtime input data for multiple input variables of the production process, the production process represented, at least in part, by a physics-based expression, with at least one term of the physics-based expression being a function of two or more input variables of the multiple input variables of the production process;
  determining, by the at least one processor based on the physics-based expression, coefficient and bias terms for a dynamic linear model connecting the multiple input variables of the production process to an output of the production process, the coefficient and bias terms of the dynamic linear model being based, at least in part, on input variables of the multiple input variables;
  providing, by the at least one processor, the dynamic linear model with the determined coefficient and bias terms in an optimization model to generate a regression-optimization model which determines an optimized value of a control variable for the production process; and
  facilitating control, at least in part, of the production process using the determined optimized value of the control variable.

18. The computer program product of claim 17, wherein the dynamic linear model comprises:

$$y = w_1^z z_1 + \ldots + w_{m_z}^z z_{m_z} + w_1^x x_1 + \ldots + w_{m_x}^x x_{m_x} + b$$

where:
 $x_1 \ldots x_{m_x}$ are primary variables;
 $z_1 \ldots z_{m_z}$ are secondary variables;
 $w_1^z, w_{m_z}^z, w_1^x, w_{m_x}^x$, are dependent on observed variables, which can be the following form:

$$\frac{[(a_{1,1} \cdot \ldots \cdot a_{1,k}) + \ldots + (a_{l,1} \cdot \ldots \cdot a_{l,k})]}{[(b_{1,1} \cdot \ldots \cdot b_{1,m}) + \ldots + (b_{n,1} \cdot \ldots \cdot b_{n,m})]}$$

where:
 $\{a_{i,j}\}_{i=1,\ldots,l; j=1,\ldots,k}$ and $\{b_{i,j}\}_{i=1,\ldots,n; j=1,\ldots,m}$ are from a group consisting of: a number; an index of a respective input variable; and a dictionary of the above fraction, with l, k, n, and m being positive integers.

19. The computer program product of claim 17, wherein the determining comprises converting terms of the physics-based expression into a specified expression, the specified expression having a numerator and a denominator where each term can be decomposed into a defined form, the defined form being from a group consisting of: a constant× (an observed input variable); a product of two or more observed input variables; and a constant×(a product of two or more observed input variables).

20. The computer program product of claim 17, wherein one or more input variables of the multiple input variables of the production process change from one production run to another production run of the production process, resulting in one or more of the coefficient and bias terms of the dynamic linear model changing dynamically from the one production run to the other production run.

* * * * *